(12) United States Patent
Sozio et al.

(10) Patent No.: US 11,434,765 B2
(45) Date of Patent: Sep. 6, 2022

(54) TURBINE ENGINE WITH AIRFOIL HAVING HIGH ACCELERATION AND LOW BLADE TURNING

(71) Applicants: General Electric Company, Schenectady, NY (US); GE Avio S.r.l., Rivalta di Torino (IT)

(72) Inventors: Ernesto Sozio, Orbassano (IT); Francesco Bertini, Piossasco (IT); Jeffrey Donald Clements, Mason, OH (US); Jonathan Ong, Garching (DE); Lyle Douglas Dailey, West Chester, OH (US); Paul Hadley Vitt, Liberrty Township, OH (US); Matteo Renato Usseglio, Turin (IT)

(73) Assignees: General Electric Company, Schenectady, NY (US); GE AVIO S.r.l., Rivalta di Torino (IT)

( * ) Notice: Subject to any disclaimer, the term of this patent is extended or adjusted under 35 U.S.C. 154(b) by 72 days.

(21) Appl. No.: 17/148,635

(22) Filed: Jan. 14, 2021

(65) Prior Publication Data

US 2021/0270137 A1 Sep. 2, 2021

(30) Foreign Application Priority Data

Feb. 11, 2020 (IT) .................... 102020000005146

(51) Int. Cl.
*F01D 5/14* (2006.01)
*F04D 29/32* (2006.01)
*F04D 29/54* (2006.01)

(52) U.S. Cl.
CPC ............ *F01D 5/141* (2013.01); *F04D 29/324* (2013.01); *F04D 29/544* (2013.01); *F05D 2220/32* (2013.01); *F05D 2240/30* (2013.01)

(58) Field of Classification Search
CPC .......... F01D 5/141; F01D 5/145; F01D 5/147; F01D 5/14; F04D 29/384; F04D 29/324; F04D 29/388; F04D 29/38; F04D 29/30
See application file for complete search history.

(56) References Cited

U.S. PATENT DOCUMENTS

| | | | | |
|---|---|---|---|---|
| 3,135,496 A | * | 6/1964 | Scheper, Jr. ............ | F01D 5/141 415/117 |
| 4,502,837 A | * | 3/1985 | Blair ........................ | F01D 5/14 415/198.1 |
| 4,981,414 A | * | 1/1991 | Sheets ..................... | F01D 5/145 415/149.1 |
| 5,152,661 A | * | 10/1992 | Sheets ..................... | F01D 5/145 415/84 |
| 5,209,644 A | | 5/1993 | Dorman | |
| 5,352,092 A | * | 10/1994 | Ferleger .................. | F01D 5/141 416/223 A |

(Continued)

FOREIGN PATENT DOCUMENTS

EP 3124794 A1 2/2017

*Primary Examiner* — Woody A Lee, Jr.
*Assistant Examiner* — Behnoush Haghighian
(74) *Attorney, Agent, or Firm* — McGarry Bair PC

(57) ABSTRACT

A turbine engine with at least a compressor section, combustor section, turbine section and a set of airfoils. The airfoils include geometric characteristics to create a high contraction ratio (CR), a low blade turning (BT) at a radially inward location the airfoil, a low solidity, or a low aspect ratio (AR).

20 Claims, 5 Drawing Sheets

(56) References Cited

U.S. PATENT DOCUMENTS

| | | | | |
|---|---|---|---|---|
| 5,616,004 | A * | 4/1997 | Alizadeh | F04D 29/384 |
| | | | | 415/119 |
| 5,779,443 | A | 7/1998 | Haller et al. | |
| 6,375,419 | B1 * | 4/2002 | LeJambre | F01D 5/141 |
| | | | | 415/191 |
| 6,709,239 | B2 * | 3/2004 | Chandraker | F01D 5/141 |
| | | | | 416/238 |
| 6,799,948 | B2 * | 10/2004 | Ito | F01D 5/141 |
| | | | | 416/223 A |
| 6,802,474 | B2 | 10/2004 | Sonoda et al. | |
| 7,175,393 | B2 * | 2/2007 | Chandraker | F01D 5/141 |
| | | | | 416/223 A |
| 7,179,058 | B2 * | 2/2007 | Chandraker | F01D 5/141 |
| | | | | 416/223 A |
| 7,204,676 | B2 * | 4/2007 | Dutton | F01D 5/141 |
| | | | | 416/238 |
| 7,374,403 | B2 | 5/2008 | Decker et al. | |
| 7,416,382 | B2 * | 8/2008 | Guemmer | F01D 5/141 |
| | | | | 415/160 |
| 7,419,353 | B2 * | 9/2008 | Guemmer | F01D 5/141 |
| | | | | 415/191 |
| 7,967,571 | B2 * | 6/2011 | Wood | F01D 5/141 |
| | | | | 416/243 |
| 8,157,518 | B2 * | 4/2012 | Decker | F04D 29/384 |
| | | | | 415/211.2 |
| 8,292,574 | B2 * | 10/2012 | Wood | F01D 5/142 |
| | | | | 415/199.5 |
| 8,337,154 | B2 * | 12/2012 | Decker | F04D 25/0606 |
| | | | | 415/191 |
| 8,439,646 | B2 * | 5/2013 | Guemmer | F01D 5/14 |
| | | | | 416/223 R |
| 8,468,826 | B2 * | 6/2013 | Kares | F01D 5/141 |
| | | | | 60/624 |
| 8,517,677 | B2 * | 8/2013 | Wood | F04D 29/324 |
| | | | | 415/199.5 |
| 8,573,946 | B2 | 11/2013 | Power et al. | |
| 8,678,757 | B2 * | 3/2014 | Li | F04D 29/544 |
| | | | | 415/191 |
| 8,864,457 | B2 * | 10/2014 | Malandra | F01D 5/141 |
| | | | | 415/191 |
| 9,046,111 | B2 * | 6/2015 | Harvey | F04D 29/544 |
| 9,200,518 | B2 * | 12/2015 | Kares | F02C 6/12 |
| 9,777,578 | B2 * | 10/2017 | Yokoyama | F01D 1/22 |
| 9,790,796 | B2 | 10/2017 | Stampfli et al. | |
| 9,797,267 | B2 * | 10/2017 | Lohaus | F01D 5/141 |
| 10,233,761 | B2 * | 3/2019 | Snider | F01D 5/187 |
| 10,577,956 | B2 * | 3/2020 | Northall | F01D 5/141 |
| 10,697,471 | B2 * | 6/2020 | Northall | F01D 25/162 |
| 11,015,449 | B2 * | 5/2021 | Koda | F01D 9/041 |
| 11,149,549 | B2 * | 10/2021 | Koda | F01D 5/141 |
| 2007/0053779 | A1 * | 3/2007 | Guemmer | F04D 29/324 |
| | | | | 416/223 R |
| 2008/0131272 | A1 * | 6/2008 | Wood | F04D 29/324 |
| | | | | 415/199.5 |
| 2008/0149205 | A1 * | 6/2008 | Gupta | F01D 5/145 |
| | | | | 137/829 |
| 2009/0123276 | A1 * | 5/2009 | Greim | F01D 5/141 |
| | | | | 415/193 |
| 2011/0129346 | A1 * | 6/2011 | Jarrah | F04D 29/541 |
| | | | | 416/214 R |
| 2012/0237344 | A1 * | 9/2012 | Wood | F01D 5/142 |
| | | | | 415/191 |
| 2013/0089415 | A1 * | 4/2013 | Brown | F01D 9/041 |
| | | | | 415/193 |
| 2014/0133982 | A1 * | 5/2014 | Dejeu | B64C 11/18 |
| | | | | 416/1 |
| 2014/0234095 | A1 * | 8/2014 | Auchoybur | F01D 9/041 |
| | | | | 415/199.5 |
| 2015/0284070 | A1 * | 10/2015 | Breeze-Stringfellow | F01D 9/02 |
| | | | | 416/124 |
| 2016/0052621 | A1 * | 2/2016 | Ireland | F04D 29/684 |
| | | | | 137/13 |
| 2016/0177723 | A1 * | 6/2016 | Lohaus | F01D 5/141 |
| | | | | 415/199.5 |
| 2018/0112547 | A1 * | 4/2018 | Snider | F01D 5/186 |
| 2018/0363554 | A1 * | 12/2018 | Kroger | F02C 7/042 |
| 2019/0048724 | A1 | 2/2019 | Tweedt | |
| 2019/0301286 | A1 * | 10/2019 | Spangler | F01D 9/065 |
| 2021/0087940 | A1 * | 3/2021 | Clark | F01D 9/042 |
| 2021/0189883 | A1 * | 6/2021 | Koda | F01D 9/065 |

* cited by examiner

TURBINE ENGINE WITH AIRFOIL HAVING HIGH ACCELERATION AND LOW BLADE TURNING

CROSS REFERENCE TO RELATED APPLICATIONS

This application claims priority to Italian Patent Application No. 102020000005146, filed Mar. 11, 2020, which is incorporated herein by reference in its entirety.

TECHNICAL FIELD

The disclosure generally relates to an airfoil for an engine, and more specifically to the geometry of said airfoil.

BACKGROUND

Turbine engines, and particularly gas or combustion turbine engines, are rotary engines that extract energy from a flow of combusted gases passing through the engine onto a multitude of rotating turbine blades.

A turbine engine includes but is not limited to, in serial flow arrangement, a forward fan assembly, an aft fan assembly, a high-pressure compressor for compressing air flowing through the engine, a combustor for mixing fuel with the compressed air such that the mixture can be ignited, and a high-pressure turbine. The high-pressure compressor, combustor and high-pressure turbine are sometimes collectively referred to as the core engine.

In at least some turbine engines, at least one turbine rotates in an opposite direction than the other rotating components within the engine. In some implementations a counter-rotating low-pressure turbine includes an outer drum having a first set of stages that are rotatably coupled to the forward fan assembly, and an inner drum having an equal number of stages that is rotatably coupled to the aft fan assembly.

Turbine engines include several components that utilize airfoils. By way a of non-limiting example, the airfoils can be located in the engine turbines, compressors, or fans. The geometry of the airfoil can affect various characteristics such as, but not limited to, contraction ratio, blade turning, solidity, or aspect ratio

BRIEF DESCRIPTION

In one aspect, the disclosure relates to a turbine engine comprising at least one blade carried by a rotor and rotating about a rotational axis, the blade comprising, an outer wall defining a pressure side and a suction side extending in a chord-wise direction between a leading edge to a trailing edge and extending in a span-wise direction between a root and a tip, a mean camber line extending between a leading edge and a trailing edge and intersecting the leading edge to define a leading edge intersection, and intersecting the trailing edge to define a trailing edge intersection, an inlet angle, $\beta_{in}$, defined by an included angle between a line parallel to the mean camber line at the leading edge intersection and the rotational axis, an outlet angle, $\beta_{out}$, defined by an included angle between a line parallel to the mean camber line at the trailing edge intersection and the rotational axis, wherein the blade has a contraction ratio (CR) of greater than 0.45 along at least 80% of a span of the at least one blade, where the CR is determined by the formula:

$$CR = 1 - \left(\frac{\cos(\beta_{out})}{\cos(\beta_{in})}\right)$$

wherein the blade has a blade turning (BT) of less than 100 degrees along at least 30% of the span, where the blade turning is determined by the formula:

$$BT = |\beta_{out}| + \frac{\beta_{in} * \beta_{out}}{|\beta_{out}|}$$

In another aspect, the disclosure relates to an airfoil configured to rotate about a rotational axis and comprising an outer wall defining a pressure side and a suction side extending in a chord-wise direction between a leading edge to a trailing edge and extending in a span-wise direction between a root and a tip, a mean camber line extending between a leading edge and a trailing edge and intersecting the leading edge to define a leading edge intersection, and intersecting the trailing edge to define a trailing edge intersection, an inlet angle, $\beta_{in}$, defined by an included angle between a line parallel to the mean camber line at the leading edge intersection and the rotational axis, an outlet angle, $\beta_{out}$, defined by an included angle between a line parallel to the mean camber line at the trailing edge intersection and the rotational axis, wherein the airfoil has a contraction ratio (CR) of greater than 0.45 along at least 80% of a span of the at least one blade, where the CR is determined by the formula:

$$CR = 1 - \left(\frac{\cos(\beta_{out})}{\cos(\beta_{in})}\right)$$

wherein the airfoil has a blade turning (BT) of less than 100 degrees along at least 30% of the span, where the blade turning is determined by the formula:

$$BT = |\beta_{out}| + \frac{\beta_{in} * \beta_{out}}{|\beta_{out}|}$$

DETAILED DESCRIPTION OF THE INVENTION

Figure 1:
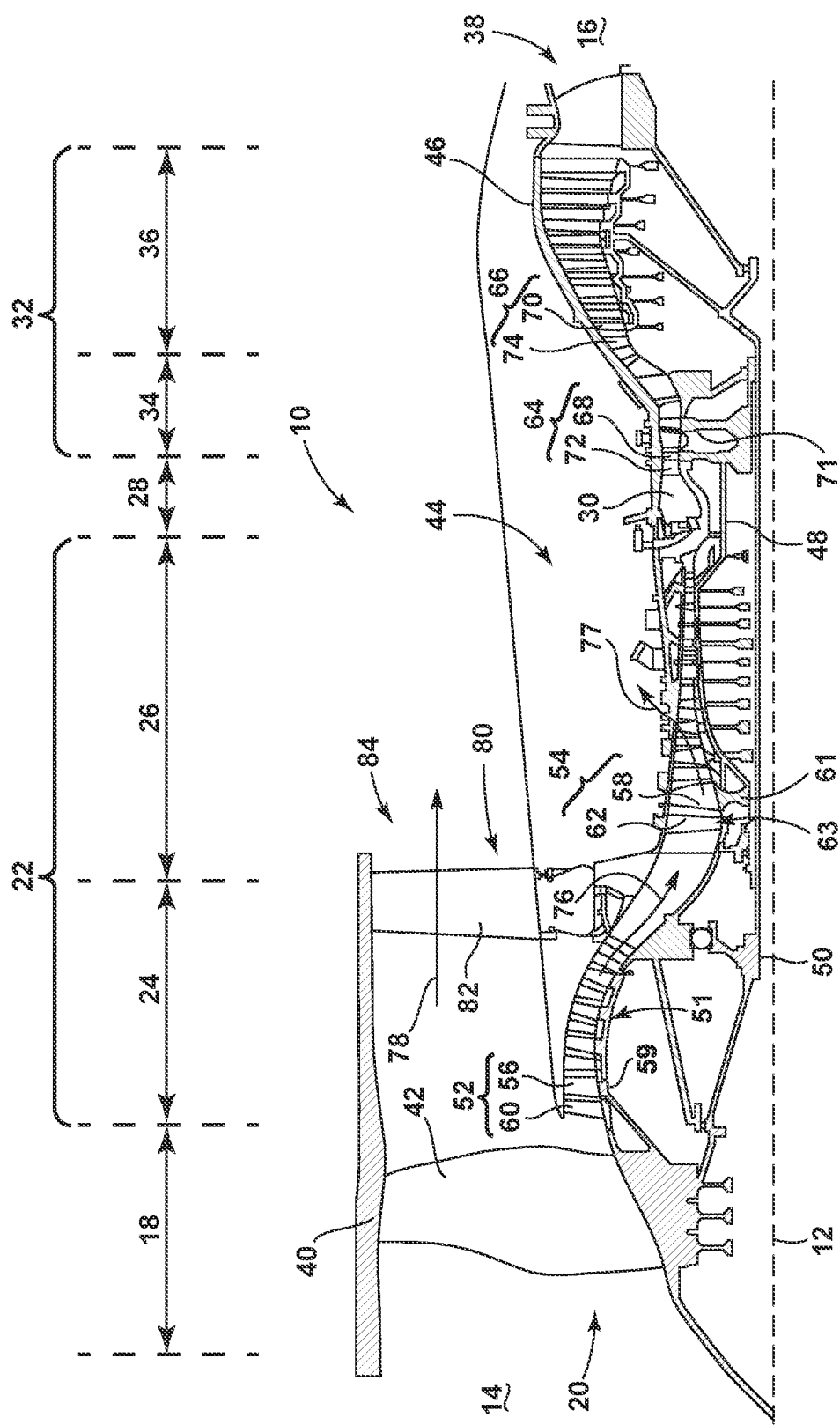
FIG. 1 is a schematic cross-sectional diagram for a gas turbine engine.

Aspects of this description are broadly directed to an airfoil with a unique profile with a predetermined contraction ratio (CR) and predetermined blade turning (BT), which collectively provide the airfoil with the ability to reduce boundary layer growth from the leading edge to the trailing edge. This profile can be used in a wide range of environments including environments having a high direct or relative rotational speed and higher centrifugal forces when compared to conventional turbine engines. Blade solidity or aspect ratio (AR) can also be controlled to further enhance the ability of the unique profile to retard boundary layer growth. The unique profile can also reduce manufacturing and material costs associated with the turbine engine.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream. While "a set of" various elements will be described, it will be understood that "a set" can include any number of the respective elements, including only one element.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The turbine engine 10 has a generally longitudinal axis or centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form an engine core 44 of the turbine engine 10, which generates combustion gases. The engine core 44 is surrounded by core casing 46, which can be coupled with the fan casing 40.

A HP shaft or spool 48 disposed coaxially about the centerline 12 of the turbine engine 10 drivingly connects the HP turbine 34 to the HP compressor 26. A LP shaft or LP spool 50, which is disposed coaxially about the centerline 12 of the turbine engine 10 within the larger diameter annular HP spool 48, drivingly connects the LP turbine 36 to the LP compressor 24 and fan 20. The HP and LP spools 48, 50 are rotatable about the engine centerline and couple to a plurality of rotatable elements, which can collectively define an inner rotor/stator 51. While illustrated as a root, it is contemplated that the inner rotor/stator 51 can be a stator.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The static turbine vanes 72, 74 for a stage of the turbine can be mounted to the core casing 46 in a circumferential arrangement.

Complementary to the rotor portion, the stationary portions of the turbine engine 10, such as the static compressor vanes and turbine blades 60, 62, 72, 74 among the compressor and turbine sections 22, 32 are also referred to individually or collectively as an outer rotor/stator 63. As illustrated, the outer rotor/stator 63 can refer to the combination of non-rotating elements throughout the turbine engine 10. Alternatively, the outer rotor/stator 63 that circumscribes at least a portion of the inner rotor/stator 51, can be designed to rotate.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

It is contemplated that a geared portion or a gear box can be included within at least a portion of the turbine engine 10. The geared portion can be configured to rotate one or more portions of the turbine engine 10 at a desired rotational velocity. For example, the LP spool 50 can be segmented such that the portion of the LP spool 50 connected to the LP turbine 36 acts as an input to a gear box of the LP spool. The remaining portion of the LP spool 50 can act as an output from the gear box of the LP spool and be operatively coupled to the fan 20 and the LP compressor 24. The gear box of the LP spool can be configured to provide a gear reduction between the LP turbine 36, the LP compressor 24, and the fan 20. As such, the LP compressor 24 and the fan 20 can rotate a first rotational velocity, while the LP turbine can rotate at a second rotational velocity different than the first rotational velocity. It will be appreciated that this is non-limiting example and that the geared portion can be applied to any suitable portion of the turbine engine 10.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of an airflow 78 bypasses the LP compressor 24 and engine core 44 and exits the turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

It will be appreciated that the turbine engine 10, and its components described herein can be implemented in other turbine engines, including but not limited to turbojet, turboprop, turboshaft, and turbofan engines. For example, the turbine engine 10 can be a vaneless counter-rotating turbine (CRT) engine where both the outer rotor/stator 63, and the inner rotor/stator 51 can be rotors.

Figure 2:
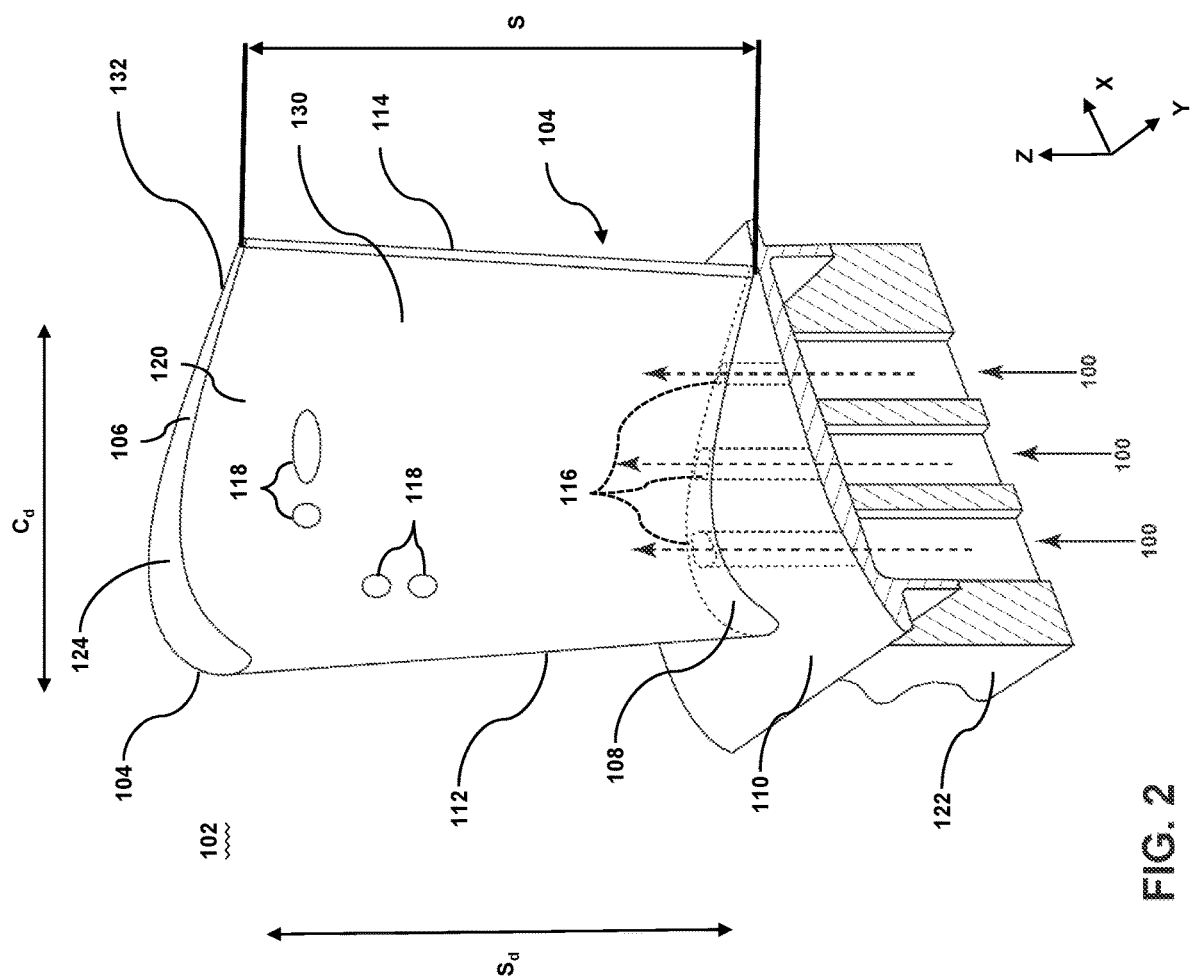
FIG. 2 is a perspective view of an airfoil that can be used with a gas turbine of FIG. 1.

FIG. 2 is a schematic, partial cross-sectional diagram of an airfoil assembly 102. The airfoil assembly 102 can include a platform 110, a dovetail 122, and an airfoil 104 that can be defined by a profile 124. The airfoil 104 can be any airfoil such as a blade or vane in the fan section 18, compressor section 22 or turbine section 32 as desired. It will be understood that the airfoil assembly 102 can also include any suitable component within the turbine engine, including a shroud, hanger, strut, platform, inner band, or outer band, in non-limiting examples.

For the purposes of explaining this drawing, a coordinate system has been placed wherein the X-axis can be defined by the centerline 12 of the turbine engine 10, the Y-axis can be defined by the circumferential axis of the turbine engine 10, the Z-axis can be defined by the radial axis of the turbine engine 10.

The airfoil 104 includes an outer wall 120, which defines a pressure side 130 and a suction side 132. The outer wall 120 can extend around the entirety of the exterior of the airfoil 104 along the pressure side 130 and the suction side 132. As such, the outer wall 120 extends between a leading edge 112 and a trailing edge 114 to define a chord-wise direction Cd, and also extends in the Z-axis radially between a root 108 and a tip 106 to define a span-wise direction Sd. A span S can be defined as the total length of the airfoil in the span-wise direction Sd from the root 108 to the tip 106.

The airfoil assembly 102 can also include the platform 110 coupled to the airfoil 104 at the root 108. In one example the airfoil 104 can be a blade of the turbine engine 10. The platform 110 can be mounted to a rotating structure to rotate about the X-axis, which rotates the airfoil about the X-axis. Alternatively, the platform 110 can be mounted to a non-rotating structure, resulting in a non-rotating airfoil. A dovetail 122 can depend from the platform 110. In such a case, the platform 110 can form at least a portion of the dovetail 122.

Multiple airfoil assemblies 102 can be circumferentially arranged about the X-axis in abutting relationship. The dovetail 122 can be received in a rotating or stationary disk to affect the circumferential arrangement.

The platform 110 shown can be a continuous, unbroken surface. Alternatively, there can be holes, channels, ducts, cracks, troughs, or any other known feature placed throughout the platform 110. These various exemplarity features of the platform can be used for various reasons to improve overall engine efficiency. These features can be used as dust escape, cooling holes, or aerodynamic efficiency boosters.

The dovetail 122 can be configured to mount to at least a portion of the inner rotor/stator 51, or outer rotor/stator 63 of the turbine engine 10. The dovetail 122 can comprise a set of inlet passages 116, exemplarily shown as three inlet passages, extending through the dovetail 122 to provide a path for communication for a fluid flow 100 to enter the airfoil 104. Alternatively, there can be any number of inlet passages 116 passing through the dovetail 122 to provide internal fluid communication with the airfoil 104. It should be understood that the dovetail 122 is shown in cross-section, such that the inlet passages 116 are housed within the body of the dovetail 122.

A plurality of outlets 118 can extend proximate the outer wall 120. The outlets 118 are illustrated as being placed in various locations along the outer wall 120. The outlets 118 can be placed along the leading edge 112, the trailing edge 114, at the root 108 of the airfoil 104, or near the tip 106 of the airfoil 104. The outlets 118 can be placed on the outer wall 120 of the pressure side 130 or the suction side 132. There can be any number of outlets 118. There can be a plurality of outlets 118 where all of the outlets 118 are of the same size and shape. The outlets 118 can be of various sizes. For example, the outlets 118 can be as small as a pin, or as large as the total length of the airfoil 104 in the span-wise direction Sd or the chord-wise direction $C_d$.

The outlets 118 are illustrated as circular ejection holes. The outlets 118 can further include in-line diffusers, diffusing slots, bleed slots, film holes, or channels, in non-limiting examples. While illustrated as being circular, the outlets 118 can also have any suitable geometric profile, including oval, square with rounded corners, or asymmetric/irregular, in non-limiting examples. The outlet 118 can be a continuous hole or slot leading into the interior of the airfoil in communication with the fluid flow 100. Alternatively, the outlet 118 can include other components such as a porous material, solid material, film, net, and/or any other reasonable material. These other components can be placed at or near the outlet 118.

The airfoil 104 can be defined by profile 124 that can create improved efficiency characteristics. For example, the profile 124 of the airfoil 104 can create a preferred contraction ratio (CR), blade turning (BT), solidity, or aspect ratio (AR). The profile 124 can be the same at the root 108 as it is at the tip 106. Alternatively, the profile of the root 108 can be different than that of the tip 106. The entire span S of the airfoil 104 can have the same profile if a cross section were taken along the rotational X-axis. Alternatively, portions of the airfoil 104 can have different profiles 124. For example, if a cross sectional view were taken at a first location, for example halfway between the root 108 and the tip 106, and a second location, for example at or near the tip 106, the profile seen at the first location can be different than the profile seen at the second location.

Figure 3:
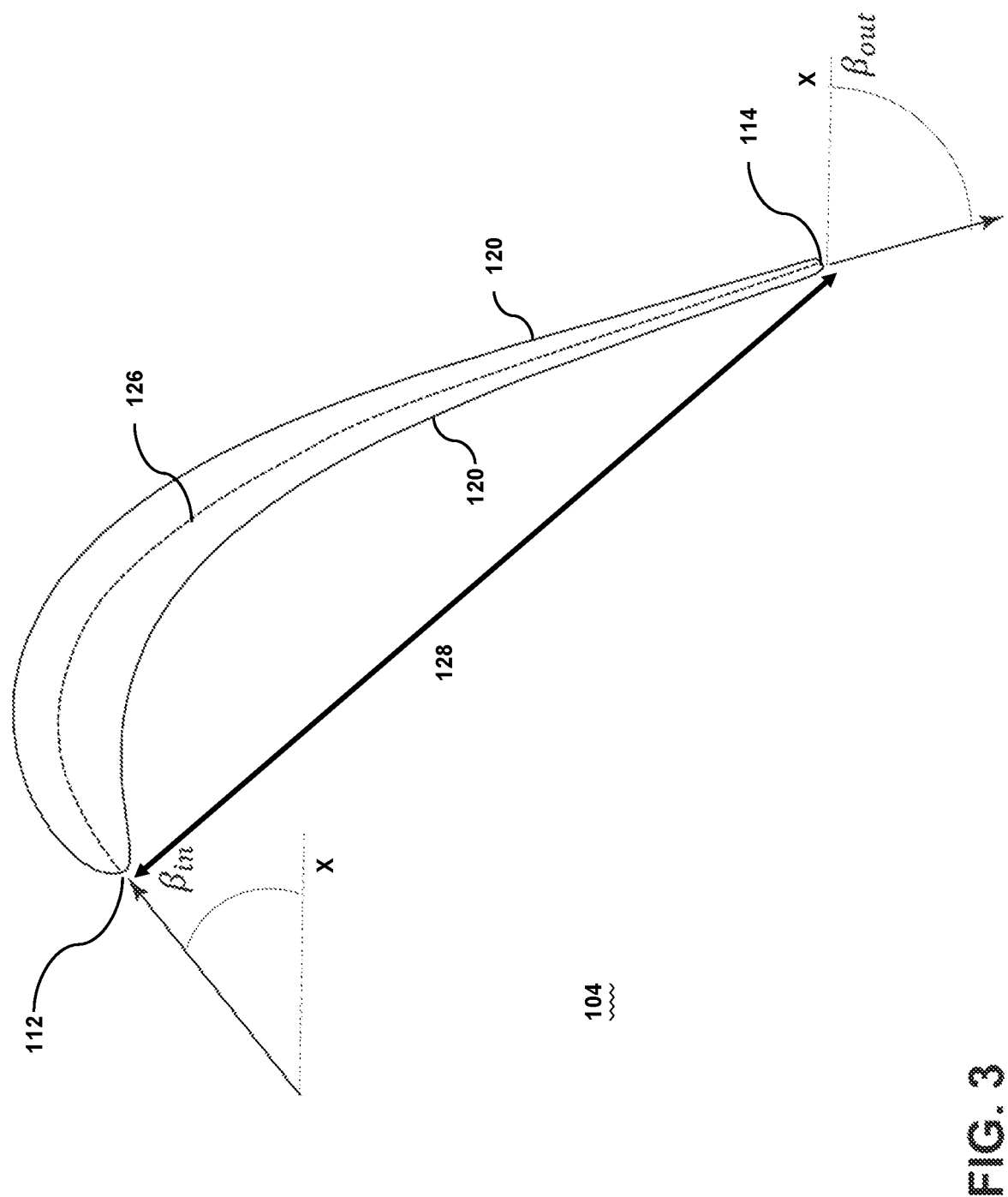
FIG. 3 is schematic view of a profile of the airfoil of FIG. 2.

FIG. 3 is a cross sectional view of the airfoil 104, and more particularly of the profile 124. The profile 124 can be defined with reference to well-known terms for defining airfoils. For example, a mean camber line 126, extending from the leading edge 112 to the trailing edge 114, is a line that is equidistant from the pressure side 130 of the outer wall 120 and the suction side 132 of the outer wall 120.

A chord line 128 can be defined as the straight-line distance from the leading edge 112 to the trailing edge 114. As illustrated, for a highly chambered airfoil as shown, the majority of the chord line 128 does not lay within the profile 124 itself, but instead extends through the pressure side 130 area of the airfoil 104. Alternatively, none of, all of, or any fraction between of the chord line 128 may lay within the profile 124.

The profile 124 includes an inlet angle $\beta_{in}$ and an outlet angle $\beta_{out}$. The inlet angle $\beta_{in}$ can be defined by the included angle between the X-axis and a line parallel to the mean camber line 126 at a leading edge intersection. Similarly, the outlet angle βout can be defined by the included angle between the X-axis and a line parallel to the mean camber line 126 at a trailing edge intersection. The leading edge intersection and the trailing edge intersection can be defined by the point of intersection of the mean camber line 126 and the leading edge 112 or trailing edge, respectively. The inlet angle $\beta_{in}$ can be positive with respect to the X-axis, while the outlet angle $\beta_{out}$ can be negative with respect to the X-axis.

It has been found that the airfoil 104 with the profile 124, which is the subject of this disclosure, can utilize geometric characteristics such as a high contraction ratio (CR), and a low blade turning (BT) along the span S to quantify the profile 124.

The CR of the airfoil 104 can be defined as the geometrical representation of the profile 124, that can produce flow accelerations from the leading edge to the trailing edge. CR can be defined through the use of the following equation:

$$CR = 1 - \left(\frac{\cos(\beta_{out})}{\cos(\beta_{in})}\right)$$

The CR value of the airfoil 104 can be relatively high when compared to other airfoils, as such, the CR can be defined as a high acceleration characteristic of the airfoil 104. The CR value of the airfoil 104 can vary across the span S of the airfoil 104. For example, the CR value can be greater than 0.55 along at least 80% of the span S, and greater than 0.45 between 80% and 100% of the span S. The maximum CR value can occur at midspan defined as a location on the airfoil 104 equidistant from the root 108 to the tip 106, while the minimum can occur at the root 108 of the airfoil 104.

The blade turning, BT of the airfoil 104, can be generally defined as a representation of the fluid flow hitting the leading edge 112 of the profile 124 at an inlet angle $\beta_{in}$ and then following the curvature of the outer wall 120 of the profile 124 to the trailing edge 114 where it exits at an outlet angle $\beta_{out}$. The total amount of "turning" the fluid flow goes through from the leading edge 112 to the trailing edge 114 can be defined as the total BT. BT can be defined through the use of the following equation:

$$BT = |\beta_{out}| + \frac{\beta_{in} * \beta_{out}}{|\beta_{out}|}$$

In the case of the airfoil 104 defined by the profile 124, the BT along at least a portion of the span S of the airfoil 104 is relatively low when compared to known airfoils, which translates into little curvature or camber. The BT value can vary along the span S of the airfoil 104. For example, the BT value can be less than 110 degrees over 100% of the span S, less than 100 degrees between 30% and 50% of the span S, and less than 90 degrees over at least 30% of the span S.

The maximum BT value can occur at a radially inward location of the airfoil 104 and a minimum can occur at a radially outward location of the airfoil 104. As used herein, the radially inward location can be a portion of the airfoil 104 that is nearest the centerline 12 of the turbine engine 10, while the radial outward location can be a portion of the airfoil 104 farthest the centerline 12. For example, the airfoil 104 can be included on the inner rotor 51, in this case, the radially inward location can be the root 108 of the airfoil 104, and the radially outward location can be the tip 106 of the airfoil 104. Conversely, the airfoil 104 can be included on the outer rotor 63 such that the radially inward location can be the tip 106 of the airfoil 104, and the radially outward location can be the root 108 of the airfoil 104. Alternatively, one or more portions of the airfoil 104 can have the same BT value.

The airfoil 104 defined by the profile 124 can have a high CR that can fall within the above-mentioned ranges, and a low BT along at least a portion of the span that can fall within the above-mentioned ranges. The combination of at least the two can retard boundary layer growth between the air flow and the outer wall 120 of the airfoil 104 on both the pressure side 130 and the suction side 132 from the leading edge 112 to the trailing edge 114. The retardation of the boundary layer can be beneficial in ensuring that the fluid flowing around the outer wall 120 of the airfoil 104 does not separate too much and create eddies or turbulence along or near the outer wall 120 of the airfoil 104. When a large amount of turbulence is experienced, pressure losses can be generated and the overall turbine engine 10 efficiency can be drastically impacted.

Figure 4:
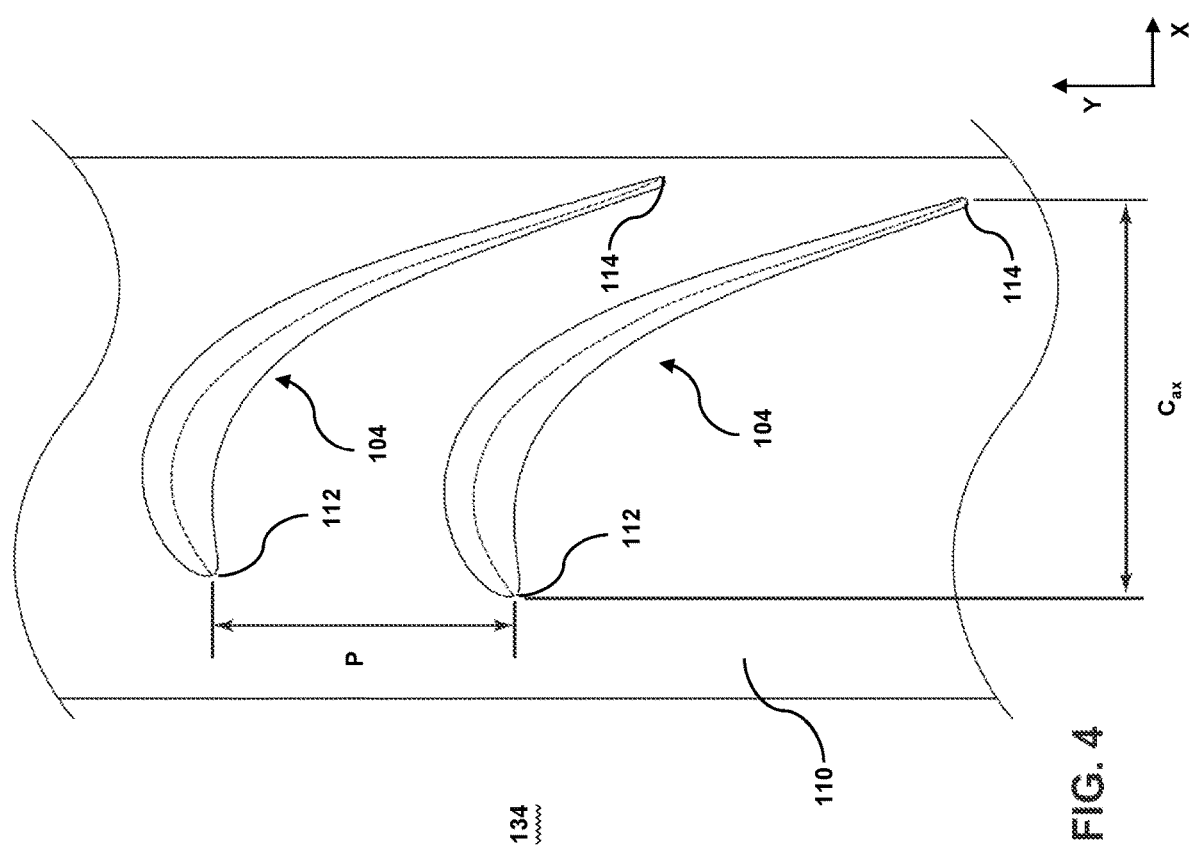
FIG. 4 is a schematic view of a plurality of airfoils of FIG. 2 placed on an engine component.

FIG. 4 is a top-down circumferential view of a portion of an annular component 134 of the turbine engine 10 illustrating two airfoils 104 spaced about the circumferential Y-axis of the engine.

The effective axial length of each of the airfoils 104 can be defined by an axial chord length $C_{ax}$ extending along the rotational X-axis. The $C_{ax}$ is the distance between a first radial line from the X-axis that intersects the leading edge and a second radial line from the X-axis that intersects the trailing edge. $C_{ax}$ can be thought of as the X-axis component of the chord line. The axial chord length $C_{ax}$ can vary depending on the location of the airfoil 104 in the turbine engine 10. For example, the axial chord length $C_{ax}$ can be larger on the annular component 134 at a first location of the turbine engine 10 than another annular component 134 at second location of the engine component. The axial chord length $C_{ax}$ can be the same for each of the airfoils 104 on a corresponding annular component 134. Alternatively, the axial chord length $C_{ax}$ can vary from each airfoil 104 on a corresponding annular component 134.

The leading edges 112 of the airfoils 104 can be spaced a distance apart defined by a pitch P extending along the circumferential Y-axis. Pitch P between adjacent airfoils 104 can be constant throughout the annular component 134. In some instance, pitch P is not be constant between adjacent airfoils 104. For example, there can be 4 airfoils where there is a first pitch P1 of a first value between a first and a second airfoil, a second pitch P2 of a second value between the second airfoil and a third airfoil, a third pitch P3 of a third value between the third airfoil and a fourth airfoil, and a fourth pitch P4 of a fourth value between the fourth airfoil and the first airfoil. Each of the first, second, third, fourth, and fifth values can be different. Alternatively, the first and the second values can be the same, while the third, and fourth values are different. All of the first, second, third, and fourth values can be the same. It will be appreciated that multiple combinations can exist.

The airfoil 104 as described herein can greatly reduce the solidity of the turbine engine 10. Solidity can be defined as the axial chord length $C_{ax}$ over the pitch P. It can be related to the number of profiles 124 and hence it can be directly related to the portion of the wetted area with respect to the fluid flow in the turbine engine 10. The solidity can be illustrated through the use of the following equation:

$$\text{Solidity} = \frac{C_{ax}}{P}$$

In this case, the solidity can be relatively low when compared to known airfoils. The solidity of the turbine engine 10 can be between 0.6 to 1.2. Specifically, the solidity of the turbine engine 10 can be 0.7 to 0.9.

Reducing the solidity, or wetted area, can provide the advantage of reducing pressure losses and hence increase overall turbine performance. Additionally, as there can be a lower number of airfoils 104 with a lower solidity, the overall airfoil count can be strongly reduced which can results in a large weight and cost decrease for the turbine engine 10.

Figure 5:
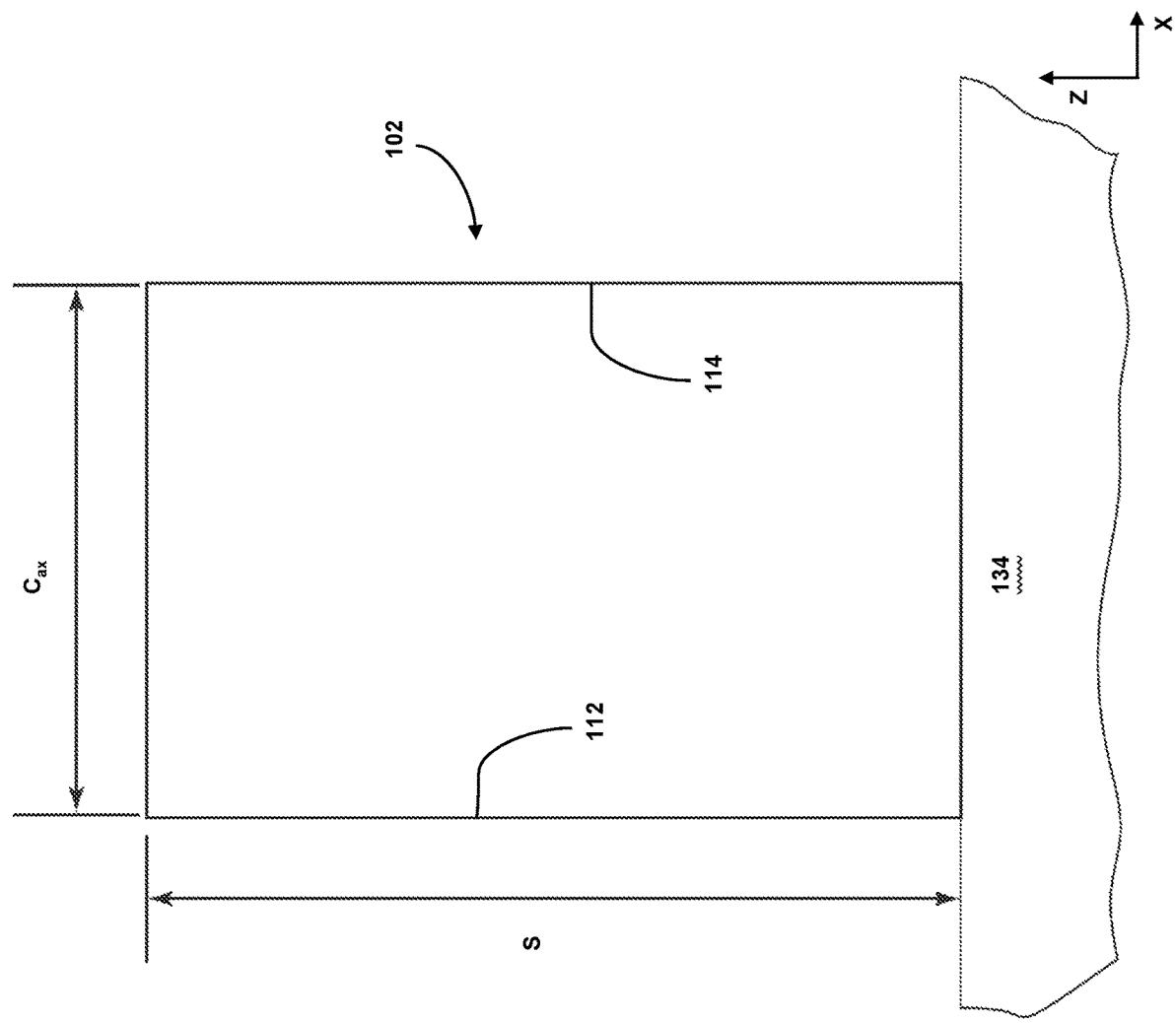
FIG. 5 is a side view of an airfoil of FIG. 2 placed on a rotatable component.

FIG. 5 is a side view the airfoil 104 in communication with an annular component 134. The annular component 134 can be any suitable component adapted to rotate about the rotational X-axis. For example, the annular component 134 can be any portion of the inner rotor 51, or outer rotor 63. Alternatively, the annular component 134 can be a bearing, a screw, a cylinder, a gear, or any other known object that can rotate about a rotational X-axis.

The airfoil 104 as described prior, can have a greatly reduced Aspect Ratio (AR) due to its span S and axial chord length $C_{ax}$. The AR can be defined as the ratio between the profile height, or the span S, of the airfoil 104 and the axial chord length $C_{ax}$. A high AR can result in a relatively tall and narrow airfoil with a substantially rectangular cross section, while a low AR can result in a stubby, or short, airfoil with a more squared cross section. The AR can be defined through the use of the following equation $$AR = \frac{S}{C_{ax}}$$

The AR of the airfoil 104 can be relatively low when compared to known airfoils. The AR of the turbine engine 10 can be 2 to 6. Specifically, the AR of the turbine engine 10 can be 3 to 5.

The airfoil 104 can be defined by the profile 124. The profile 124 can cause the airfoil 104 to have a high CR, and low BT at the radially inward location can enable a turbine engine 10 with airfoils 104 having low AR designs when compared to other airfoils having a lower CR and a higher BT. The airfoils 104 can have a lower AR which can allow for a lower overall number of airfoils 104 needed for the turbine engine 10 for a given solidity. This can be beneficial for performance as it can increase the Reynolds number of the airfoil 104, and reduce the cost of the turbine engine 10 as there can be a smaller amount of material used for the manufacturing of the turbine engine 10, and the airfoils 104.

As used herein, the terms "high" and "low" are used as a comparison to past airfoil designs. For example, past airfoil designs can have CR values ranging from 0.4 to 0.5 at midspan, and 0.2 to 0.3 at a minimum location. In comparison, the airfoil 104 defined by the profile 124 can have a relatively "high" CR value of greater than 0.55 along at least 80% of the span S and greater than 0.45 between 80% and 100% of the span S.

The airfoil 104 can be adapted for use in CRT engines as the relative velocity of the turbine engine 10 is relatively high when compared to a traditional turbine engine with a single rotor and a single stator per stage. For example, a traditional turbine for a large commercial engine can rotate with speeds up to 8000 RPM while a CRT engine can rotate with relative velocities upwards of 12000 RPM. Known airfoils can malfunction at the higher RPM that can be experienced in CRT engines. The current airfoil 104 can have a high CR and a low BT at the radially inward location which results in an airfoil better suited for a larger range of relative velocities.

The airfoil 104 can be better suited to withstand higher centrifugal forces. During operation of the turbine engine 10, the airfoils 104 can experience higher centrifugal forces depending on the location of the airfoil in the compressor or the turbine. The airfoil 104 can have a higher CR, a lower BT at the radially inward location, and a lower AR that can allow them to withstand higher centrifugal forces than other known airfoils. In return, the airfoils 104 can withstand the higher relative velocities as outlined above.

The airfoil 104 that can have a high CR and a low BT at the radially inward location that can allow for a low AR and a low solidity. A low AR and a low solidity can not only decrease losses and hence increase overall engine efficiency; however, they can also greatly reduce the number of airfoils and the overall weight of the airfoils which greatly reduces the overall cost of the turbine engine 10.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A turbine engine comprising at least one blade carried by a rotor and rotating about a rotational axis, the blade comprising, an outer wall defining a pressure side and a suction side extending in a chord-wise direction between a leading edge to a trailing edge and extending in a span-wise direction between a root and a tip, a mean camber line extending between a leading edge and a trailing edge and intersecting the leading edge to define a leading edge intersection, and intersecting the trailing edge to define a trailing edge intersection, an inlet angle, $\beta_{in}$, defined by an included angle between a line parallel to the mean camber line at the leading edge intersection and the rotational axis, an outlet angle, $\beta_{out}$, defined by an included angle between a line parallel to the mean camber line at the trailing edge intersection and the rotational axis, wherein the blade has a contraction ratio (CR) of greater than 0.45 along at least 80% of a span of the at least one blade, where the CR is determined by the formula:

$$CR = 1 - \left(\frac{\cos(\beta_{out})}{\cos(\beta_{in})}\right)$$

wherein the blade has a blade turning (BT) of less than 100 degrees along at least 30% of the span, where the blade turning is determined by the formula:

$$BT = |\beta_{out}| + \frac{\beta_{in} * \beta_{out}}{|\beta_{out}|}$$

2. The turbine engine of any preceding clause wherein is constant along the span from the root to the tip.

3. The turbine engine of any preceding clause wherein, $\beta_{out}$ is constant along the span from the root to the tip.

4. The turbine engine of any preceding clause wherein CR is greater than 0.55 along at least 80% of the span.

5. The turbine engine of any preceding clause wherein a maximum CR value occurs at a midspan of the blade between the root and the tip.

6. The turbine engine of any preceding clause wherein BT is less than 90 degrees along at least 30% of the span.

7. The turbine engine of any preceding clause wherein BT is less than 110 degrees along the entire span.

8. The turbine engine of any preceding clause wherein an aspect ratio of the at least one blade is less than 6.

9. The turbine engine of any preceding clause wherein the aspect ratio is less than 5 and at least 3.

10. The turbine engine of any preceding clause wherein the at least one blade comprises multiple blades that are circumferentially spaced about the rotor.

11. The turbine engine of any preceding clause wherein a solidity is less than 0.9.

12. The turbine engine of any preceding clause wherein an aspect ratio of the multiple blades is less than 5.0.

13. The turbine engine of any preceding clause wherein the CR is greater than 0.45 along at least 80% of the span, the BT is less than 100 degrees along at least 30% of the span, an aspect ratio is less than 5, and a solidity that is less than 0.9.

14. The turbine engine of any preceding clause wherein the rotor has two counter-rotating portions, with the at least one blade being carried by at least one of the two counter-rotating portions.

15. The turbine engine of any preceding clause wherein the at least one blade comprises a first blade on one of the counter-rotating portions and a second blade on the other of the counter-rotating portions.

16. The turbine engine of any preceding clause wherein the outer wall bounds an interior having at least one cooling air passage, and at least one cooling hole extends from cooling air passage to an outer surface of the outer wall.

17. An airfoil configured to rotate about a rotational axis and comprising an outer wall defining a pressure side and a suction side extending in a chord-wise direction between a leading edge to a trailing edge and extending in a span-wise direction between a root and a tip, a mean camber line extending between a leading edge and a trailing edge and intersecting the leading edge to define a leading edge intersection, and intersecting the trailing edge to define a trailing edge intersection, an inlet angle, Pin, defined by an included angle between a line parallel to the mean camber line at the leading edge intersection and the rotational axis, an outlet angle, Pout, defined by an included angle between a line parallel to the mean camber line at the trailing edge intersection and the rotational axis, wherein the airfoil has a contraction ratio (CR) of greater than 0.45 along at least 80% of a span of the at least one blade, where the CR is determined by the formula:

$$CR = 1 - \left(\frac{\cos(\beta_{out})}{\cos(\beta_{in})}\right)$$

wherein the airfoil has a blade turning (BT) of less than 100 degrees along at least 30% of the span, where the blade turning is determined by the formula:

$$BT = |\beta_{out}| + \frac{\beta_{in} * \beta_{out}}{|\beta_{out}|}$$

|18. The airfoil of any preceding clause wherein, $\beta_{in}$, is constant along the span the root to the tip.

19. The airfoil of any preceding clause wherein, $\beta_{out}$ is constant along the span from the root to the tip.

20. The airfoil of any preceding clause wherein CR is greater than 0.55 along at least 80% of the span.

21. The airfoil of any preceding clause wherein a maximum CR value occurs at a midspan of the airfoil between the root and the tip.

22. The airfoil of any preceding clause wherein BT is less than 90 degrees along at least 30% of the span.

23. The airfoil of any preceding clause wherein BT is less than 110 degrees along the entire span.

24. The airfoil of any preceding clause wherein an aspect ratio is less than 5 and at least 3.

25. The airfoil of any preceding clause wherein there are multiple circumferentially spaced airfoils about a rotor.

26. The airfoils of any preceding clause wherein a solidity is less than 0.9.

27. The airfoils of any preceding clause wherein the CR is greater than 0.45 along at least 80% of the span, the BT is less than 100 degrees along at least 30% of the span, an aspect ratio is less than 5, and a solidity that is less than 0.9.

What is claimed is:

1. A turbine engine comprising: at least one blade carried by a rotor and rotating about a rotational axis, the at least one blade comprising: an outer wall defining a pressure side and a suction side extending in a chord-wise direction between a leading edge to a trailing edge and extending in a span-wise direction between a root and a tip; a mean camber line extending between the leading edge and the trailing edge and intersecting the leading edge to define a leading edge intersection, and intersecting the trailing edge to define a trailing edge intersection; an inlet angle, $\beta_{in}$, in degrees defined by an included angle between a line parallel to the mean camber line at the leading edge intersection and the rotational axis; an outlet angle, $\beta_{out}$, in degrees defined by an included angle between a line parallel to the mean camber line at the trailing edge intersection and the rotational axis; wherein the at least one blade has a contraction ratio (CR) of greater than 0.55 along at least 80% of a span of the at least one blade, wherein the contraction ratio (CR) is determined by the formula:

$$CR = 1 - \left(\frac{\cos(\beta_{out})}{\cos(\beta_{in})}\right)$$

wherein the at least one blade has a blade turning (BT) of less than 100 degrees along at least 30% of the span, wherein the blade turning (BT) is determined by the formula:

$$BT = |\beta_{out}| + \frac{\beta_{in} \times \beta_{out}}{|\beta_{out}|}.$$

2. The turbine engine of claim 1 wherein $\beta_{in}$ constant along the span from the root to the tip.

3. The turbine engine of claim 1 wherein $\beta_{out}$ is constant along the span from the root to the tip.

4. The turbine engine of claim 1 wherein the blade turning (BT) is less than 90 degrees along at least 30% of the span.

5. The turbine engine of claim 4 wherein the blade turning (BT) is less than 110 degrees along the entire span.

6. The turbine engine of claim 1 wherein the at least one blade comprises multiple blades that are circumferentially spaced about the rotor.

7. The turbine engine of claim 6 wherein a blade solidity of the multiple blades is less than 0.9.

8. The turbine engine of claim 6 wherein a blade aspect ratio of the multiple blades is less than 5 and at least 3.

9. The turbine engine of claim 1 wherein the rotor has two counter-rotating portions, with the at least one blade being carried by at least one of the two counter-rotating portions.

10. The turbine engine of claim 9 wherein the at least one blade comprises a first blade on one of the counter-rotating portions and a second blade on the other of the counter-rotating portions.

11. An airfoil configured to rotate about a rotational axis and comprising: an outer wall defining a pressure side and a suction side extending in a chord-wise direction between a leading edge to a trailing edge and extending in a span-wise direction between a root and a tip; a mean camber line extending between the leading edge and the trailing edge and intersecting the leading edge to define a leading edge intersection, and intersecting the trailing edge to define a trailing edge intersection; an inlet angle, $\beta_{in}$, in degrees defined by an included angle between a line parallel to the mean camber line at the leading edge intersection and the rotational axis; an outlet angle, $\beta_{out}$, in degrees defined by an included angle between a line parallel to the mean camber line at the trailing edge intersection and the rotational axis; wherein the airfoil has a contraction ratio (CR) of greater than 0.55 along at least 80% of a span of the airfoil, wherein the contraction ratio (CR) is determined by the formula:

$$CR = 1 - \left(\frac{\cos(\beta_{out})}{\cos(\beta_{in})}\right)$$

wherein the airfoil has a blade turning (BT) of less than 100 degrees along at least 30% of the span, wherein the blade turning (BT) is determined by the formula:

$$BT = |\beta_{out}| + \frac{\beta_{in} \times \beta_{out}}{|\beta_{out}|}$$

12. The airfoil of claim 11 wherein $\beta_{in}$ is constant along the span from the root to the tip.

13. The airfoil of claim 11 wherein $\beta_{out}$ is constant along the span from the root to the tip.

14. The airfoil of claim 11 wherein the blade turning (BT) is less than 110 degrees along the entire span.

15. The airfoil of claim 11 wherein an airfoil aspect ratio is less than 5 and at least 3.

16. The airfoil of claim 11 wherein there are multiple circumferentially spaced airfoils about a rotor.

17. The airfoil of claim 16 wherein an airfoil solidity of the multiple circumferentially spaced airfoils is less than 0.9.

18. The airfoil of claim 16 wherein an airfoil aspect ratio is less than 5, and an airfoil solidity of the multiple circumferentially spaced airfoils that is less than 0.9.

19. An airfoil configured to rotate about a rotational axis and comprising: an outer wall defining a pressure side and a suction side extending in a chord-wise direction between a leading edge to a trailing edge and extending in a span-wise direction between a root and a tip; a mean camber line extending between the leading edge and the trailing edge and intersecting the leading edge to define a leading edge intersection, and intersecting the trailing edge to define a trailing edge intersection; an inlet angle, $\beta_{in}$, in degrees defined by an included angle between a line parallel to the mean camber line at the leading edge intersection and the rotational axis; an outlet angle, $\beta_{out}$, in degrees defined by an included angle between a line parallel to the mean camber line at the trailing edge intersection and the rotational axis; wherein the airfoil has a contraction ratio (CR) of greater than 0.45 along at least 80% of a span of the airfoil, where the contraction ratio (CR) is determined by the formula:

$$CR = 1 - \left(\frac{\cos(\beta_{out})}{\cos(\beta_{in})}\right)$$

wherein the airfoil has a blade turning (BT) of less than 100 degrees along at least 30% of the span, wherein the blade turning (BT) is determined by the formula:

$$BT = |\beta_{out}| + \frac{\beta_{in} \times \beta_{out}}{|\beta_{out}|}$$

wherein $\beta_{in}$ is constant along the span from the root to the tip, or $\beta_{out}$ is constant along the span from the root to the tip.

20. The airfoil of claim 19 wherein the contraction ratio (CR) is greater than 0.55 along at least 80% of the span.

\* \* \* \* \*